United States Patent [19]
Bakke et al.

[11] 3,960,687
[45] June 1, 1976

[54] ELECTROSTATICALLY ENHANCED REMOVAL OF SULFUR DIOXIDE FROM GASEOUS CARRIERS

[75] Inventors: Even Bakke, New Providence; Michael Witte, Chatham; Manankumar S. Mehta, Parsippany, all of N.J.

[73] Assignee: U.S. Filter Corporation, New York, N.Y.

[22] Filed: Oct. 29, 1973

[21] Appl. No.: 410,447

[52] U.S. Cl. .............................. 204/164; 204/174; 423/242
[51] Int. Cl.² ...................... C01B 17/60; B01K 1/00
[58] Field of Search ............. 204/174, 164; 423/242

[56] References Cited
UNITED STATES PATENTS

| | | | |
|---|---|---|---|
| 2,031,802 | 2/1936 | Tyner | 423/243 |
| 3,633,339 | 1/1972 | Wiewcovowski et al. | 423/242 |
| 3,695,829 | 10/1972 | Griffin et al. | 423/242 |
| 3,733,781 | 5/1973 | Bellisio et al. | 55/73 |
| 3,765,153 | 10/1973 | Grey | 55/118 |
| 3,775,094 | 11/1973 | McKie | 75/74 |
| 3,880,983 | 4/1975 | Welty et al. | 423/242 |
| 3,911,093 | 10/1975 | Shevif et al. | 423/574 |

FOREIGN PATENTS OR APPLICATIONS 1,143,847  2/1969  United Kingdom................. 423/242

*Primary Examiner*—F.C. Edmundson
*Attorney, Agent, or Firm*—Isner, Nims, Howes and Collison

[57] ABSTRACT

Closed circuit process for effecting the selective removal of sulfur dioxide values from industrial waste gases or the like wherein a particularly constituted confined solution of mixed ammonium phosphates is exposed to absorbent contact with a sulfur dioxide bearing gas stream in an electrostatic force field followed by a thermally induced desorption of recoverable sulfur dioxide values therefrom and regeneration of the solution preparatory to reexposure thereof to the suflur dioxide bearing gas stream.

4 Claims, 1 Drawing Figure

U.S. Patent   June 1, 1976   3,960,687
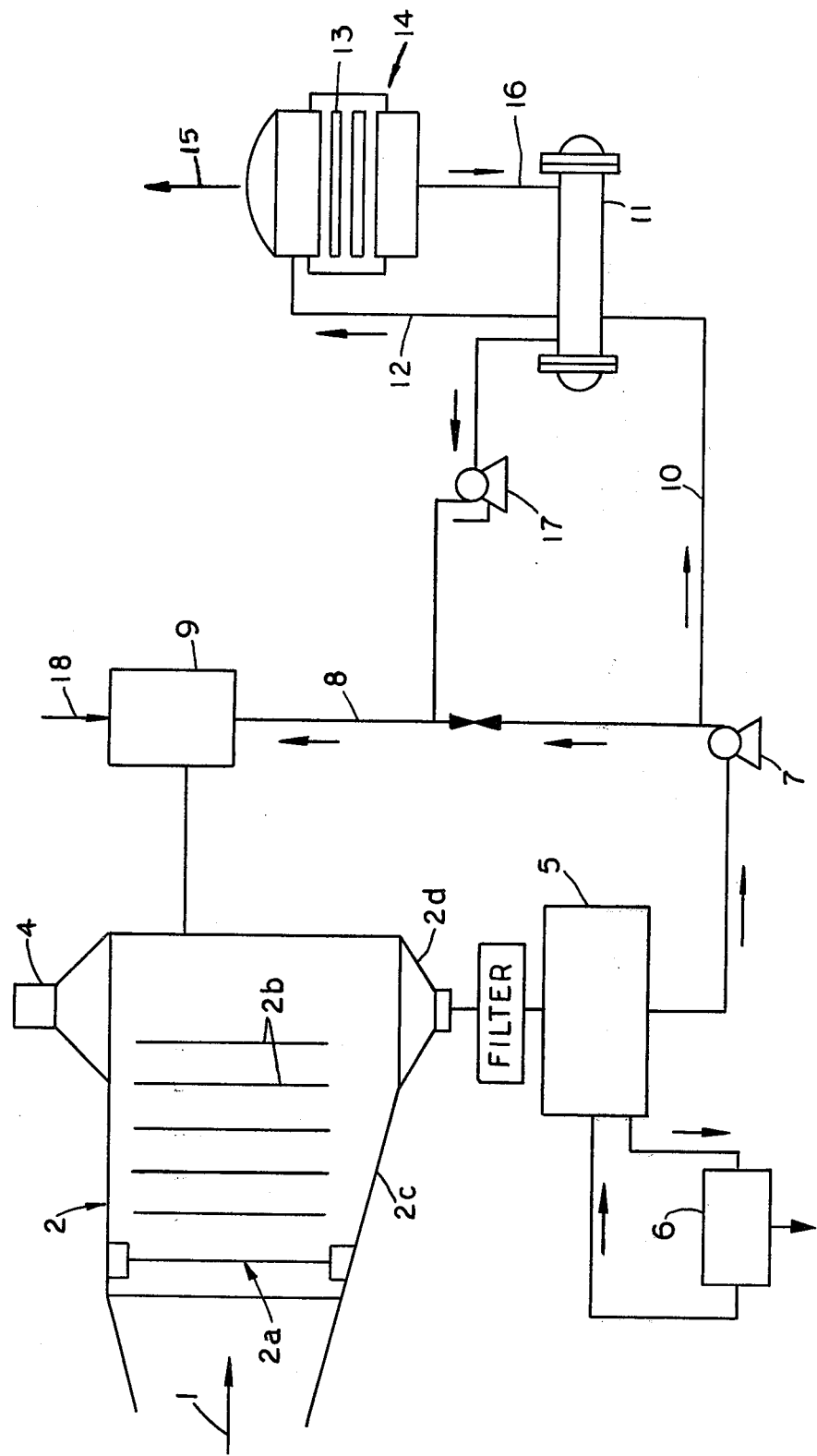

ELECTROSTATICALLY ENHANCED REMOVAL OF SULFUR DIOXIDE FROM GASEOUS CARRIERS

This invention relates to the removal of sulfur dioxide from gas streams and more particularly to an improved closed circuit process for continuously removing and recovering sulfur dioxide values from industrial waste gases.

The ever increasing quantitative atmospheric emission of sulfur dioxide, which largely results from the combustion of sulfur-bearing fossil fuels in the smelting of metals and in the generation of electric power, poses such serious public health and associated property damage problems as to render the efficient and practical removal of sulfur dioxide from such industrial waste gases a major objective in the overall national effort for effecting environmental controls. The magnitude and importance of the problem has resulted in a concerted and accelerated widespread effort, over the past years, to develop high efficiency, low cost and commercially practical methods for effecting such sulfur dioxide removal and the technical literature is replete with diverse proposals and suggestions as to how this desirable end might be attained. While such diverse efforts have, from a purely chemical standpoint, been attended with varying degrees of success, the attainment of a high efficiency and continuously operable low cost sysem that is essentially compatible with the physical parameters attendant existing industrial waste gas handling systems and which is, moreover, readily adapted to widespread usage has not, as yet, been commercially realized.

This invention may be briefly described as an improved closed circuit process for continuously effecting the selective removal and recovery of sulfur dioxide values from a sulfur dioxide-bearing industrial waste gas stream such as, for example, generated in the smelting of metals, through the selective absorption thereof in a mixed ammonium phosphate salt solution in the presence of an electrostatic force field and a subsequent thermally induced stripping of the absorbent sulfur dioxide values therefrom. In its broader aspects, the subject invention includes the introduction of a sulfur-dioxide-bearing gas stream under ambient conditions into absorbent contact with a selectively constituted solution of mono-ammonium phosphate and di-ammonium phosphate in the presence of an electrostatic depositing system to effect the selective removal of the sulfur dioxide values therefrom followed by a thermally induced desorption of the sulfur dioxide values from the sulfur dioxide enriched solution in a low oxygen content atmosphere preparatory to the reintroduction of the sulfur dioxide depleted and reconstituted mixed ammonium phosphate salt solution into renewed absorbent contact with the sulfur dioxide-bearing waste gas stream. In its somewhat narrower aspects the subject invention includes the passage of a water vapor saturated sulfur dioxide bearing gas stream past a corona emitting set of electrodes defining one terminus of an electrostatic depositing field and into, at least in part, electrostatically induced absorbent contact with a confined and at least partially recycled aqueous absorbent solution of a mixture concentration of about 300 to 500 grams/liter of mono-ammonium phosphate and about 30 to 125 grams/liter of diammonium phosphate and in which the proportion by weight of monoammonium phosphate to di-ammonium phosphate is in the range of about 4 to 1 up to about 10 to 1; followed by the utilization of superheated steam or suitably preconditioned hot inert gas or flue gas to effect the thermally induced desorption of the sulfur dioxide values therefrom within a continuously operable and automatically regulatable closed circuit system, in which the temperature of the aqueous mixed ammonium phosphate solution is maintained throughout the system at least at a predetermined value greater than that of the water vapor-saturated sulfur dioxide bearing gas stream being teated, and in which a substantially constant volume of the mixed ammonium phosphate salt solution of the requisite character is maintained in the system at all times.

Among the significant advantages of the subject invention is the provision of a continuously operable, high efficiency and low cost process for effecting the removal of readily recoverable sulfur dioxide values from sulfur dioxide-bearing gas streams, such as industrial and utility waste gases, together with at least some of the industrial particulates entrained therein; a permitted reduction of carrier reagent consumption to minimal values in a closed circuit regenerative system; a permitted utilization of readily controllable operating parameters and consequently facilitated automatic operation over extended periods of time; a permitted economic utilization of available waste heat values in selected operational phases thereof; and a basic operational compatibility with the physical parameters of existing conventional industrial waste gas systems. Still further advantages of the subject invention are the permitted utilization of low cost reagents and the delivery of high purity sulfur dioxide values in forms readily adapted to further treatment for the efficient and economic recovery of the sulfur values therein in commercially useful forms: for example, as elemental sulfur or as sulfuric acid.

The principal object of this invention is the provision of an improved, continuously operable, closed circuit regenerative process for effecting the efficient and economic removal of sulfur values from industrial waste gases.

Another object of this invention is the provision of a continuously operable, high efficiency and low cost process for effecting the selective removal of sulfur dioxide values from sulfur dioxide-bearing gas streams and recovery thereof as a high purity product in forms that are readily adapted to further treatment for the efficient and economic recovery of the sulfur values therein in commercially useful forms.

A further object of the subject invention is the provision of an improved closed circuit, continuously operable process for economically effecting the selective removal of sulfur dioxide values and industrial particulates from the sulfur dioxide bearing gas streams, such as industrial waste gases, that is operatively compatible with the physical parameters of conventional industrial waste gas systems.

Other objects and advantages of the subject invention will become apparent from the following specification and claims and from the accompanying drawings which illustrate, in accord with the mandate of the patent statute, the principles of the invention in association with schematically illustrative apparatus by which the operative steps of the subject method may be carried out.

The appended drawing is a schematic flow diagram illustrating certain operative process steps incorporating the principles of this invention.

As noted above, the subject process desirably contemplates a closed circuit absorption-desorption system in which a selectively constituted mixed aqueous solution of ammonium phosphate salts is disposed in intimate absorbent contact within an electrostatic force field field with a water vapor-saturated and sulfur dioxide-bearing waste gas stream to effect a selective removal of the sulfur dioxide values therefrom together with a concomitant removal of particulates as well and in which such sulfur dioxide values are subsequently thermally stripped therefrom in a low oxygen environment to provide both a high purity sulfur dioxide-bearing product, such as a sulfur dioxide rich inert gas stream or a wet sulfur dioxide gas, and a regenerated solution of the mixed ammonium phosphate salts for subsequent re-exposure to the sulfur dioxide-bearing waste gas stream.

While both inorganic and certain organic ammonium phosphates, such as alkyl or aryl ammonium phosphates, appear to be basically operable, because of their better than marginally acceptable reaction rates in both the absorption and desorption of sulfur dioxide, their high solubility in water and their general stability under the operating conditions involved; the use of inorganic ammonium phosphates and specifically a selectively constituted mixed aqueous solution of monoammonium phosphate and diammonium phosphate appears to be the most suitable and therefore preferred. Economic operation dictates that such mixed mono- and diammonium phosphate salt solutions desirably be maintained as close to a saturated condition under the ambient conditions as is possible in the absorber cycle of the process, which, as will be pointed out at a later point in this specification, is the lower temperature operating zone of the system, albeit such lower temperature being maintained at a value sufficiently above that of the water vapor saturated sulfur dioxide bearing gas stream that is being treated so as to minimize, if not prevent undesired water vapor condensation therein. Of at least equal, if not of greater significance, however, is the enhanced absorption of the sulfur dioxide values in an electrostatic force field environment in association with the required quantitative proportioning of monoammonium phosphate to diammonium phosphate in such solution due to their respective markedly different absorption and desorption characteristics. Desirably, the proportion by weight of monoammonium phosphate to diammonium phosphate is in the range of about 4 to 1 to about 10 to 1, with the lower range proportions of about 4:1 to about 6:1 being preferred.

While not fully understood at the present time, it is believed that enhanced absorption is effected within the electrostatic force field environment and that the specified proportions of mono- and diammonium phosphates and the maintenance of substantially saturated solution thereof are such as to result in highly efficient and ready thermal desorption of the sulfur dioxide values therefrom with minimal loss of carrier reagent due to oxidation or other decomposition and yet provide a practical carrier reagent that will effect in the presence of such electrostatic force field a satisfactory quantitative, and yet qualitatively selective, absorption of sulfur dioxide in preference to other acidic gases normally present in utility and waste gases, such as carbon monoxide and carbon dioxide.

In the absorber phase of the cycle the reactions that proceed, in the removal of sulfur dioxide values from a water vapor-saturated gas stream, are believed to be as follows:

$$NH_4H_2PO_4 + SO_2 + H_2O \rightarrow NH_4HSO_3 + H_3PO_4 \quad (1)$$

$$(NH_4)_2HPO_4 + SO_2 + H_2O \rightarrow NH_4HSO_3 + NH_4H_2PO_4 \quad (2)$$

Desorption of the selectively absorbed sulfur dioxide values from the described selectively constituted aqueous solution of monoammonium phosphate and diammonium phosphate is readily effected in the desorber cycle by thermal stripping in the higher temperature operating zone of the system to provide either a sulfur dioxide-rich inert gas stream or a wet sulfur dioxide gas, together with a regenerated solution of said mixed aqueous solution of monoammonium phosphate and diammonium phosphate for subsequent re-exposure in the absorber cycle to the sulfur dioxide bearing gas stream. The stripped sulfur dioxide values can, dependent upon the particular character of the thermal stripping operation, be dried and compressed; converted into readily marketable sulfuric acid; or, if an inexpensive source of hydrogen sulfide gas or other suitable reagent is available, converted into elemental sulfur.

It is operationally desirable that the thermally induced desorption be effected in the presence of a minimal amount of oxygen so as to prevent the irreversible oxidation of the attendant ammonium bisulfite to bisulfate form, i.e.

$$2 NH_4HSO_3 + O_2 \rightarrow 2NH_4HSO_4 \quad (3)$$

and to permit the desired thermally induced regeneration of the mixed mono and diammonium phosphate salt solution, i.e.

$$NH_4HSO_3 + H_3PO_4 \xrightarrow{\Delta} NH_4H_2PO_4 + SO_2 + H_2O \quad (4)$$

$$NH_4HSO_3 + NH_4H_2PO_4 \xrightarrow{\Delta} (NH_4)_2HPO_4 + SO_2 + H_2O \quad (5)$$

to take place with effectively minimal losses thereof through oxidation or other factors.

Such thermally induced desorption is preferably effected by the utilization of superheated steam which not only supplies the necessary thermal values but also serves to provide an inert oxygen limited atmosphere and assures operations at a sufficiently high temperture as to preclude condensation of water vapor, at least to an extent that would materially affect the volume and resultant concentration of the aqueous mixed monoammonium phosphate and diammonium phosphate solution that serves as the carrier reagent for the system.

Continuous operation of a closed circuit system embodying the disclosed process at a high efficiency level requires the maintenance of a substantially constant volume of the selectively constituted carrier reagent in the system at all times and, as is now apparent from the absorption and desorption equations set forth above, operations must be effected in such manner as to minimize, if not totally avoid, the addition and/or loss of water during the absorption and desorption phases thereof. To the above ends, the sulfur dioxide-bearing waste gas should be saturated with water vapor at the time of its absorbent contact exposure within the electrostatic force field with the selectively constituted aqueous mixed monoammonium phosphate and diammonium phosphate solution and should also be at a lower temperature than that of such absorbent salt solution. In instances where the waste gas to be treated is emanating from a wet scrubber or other wet type removant of particulates, the waste gas usually will be in the requisite water vapor-saturated condition without the need for water-vapor content adjustment. In other instances wherein particulate removal has been effected by dry type separation apparatus, as for example by passage of the waste gas through a baghouse, it will normally be necessary to introduce sufficient water vapor into the gas stream to raise it to a water vapor saturated condition under the ambient conditions contemplated herein. Likewise, water should not be added or, if possible, removed from the basic carrier reagent solution in the desorber cycle and such is facilitated by the conjoint use of superheated steam as the thermal stripping agent in association with the raising of the temperature of the sulfur dioxide-bearing portions of the carrier reagent solution prior to the actual desorption operations, so as to minimize, if not avoid, undesired steam condensation therein. Water losses from the system, as for example as might occur in the desorber cycle are readily replaced through a make up line or the like.

As pointed out earlier, economic operation dictates employment of such selectively constituted mixed aqueous solution of mono and diammonium phosphate at as high a salt concentration as is practicable in any given intallation. In fact, operations should desirably proceed with such solution being as near to a saturated condition under the ambient conditions as it is feasible to safely maintain with preclusion of significant crystallization in the absorber cycle which will, because of the temperatures of the waste gas to be treated at the point of entry, be the locus of the lowest temperatures extant within the system. Thus, the temperature of the selectively constituted mixed aqueous solution of mono and diammonium phosphate must be maintained at a value equal to or greater than that of the entry temperature of the waste gas to be treated and preferably such solution must be maintained at least 10°F thereabove, both at the point of waste gas entry into and during the waste gas passage through the locus of absorption. All carrier reagent solution temperatures elsewhere in the system will be appreciably higher than this minimum value.

As will now be apparent to those skilled in this art, the herein disclosed absorption-desorption process is additionally characterized by a ready adaptability to continuous operation under automated control. The temperature parameters set forth above are such as to be readily and easily sensed and monitored by conventional regulating equipment adapted to continually sense temperatures at selected locations and initiate corrective actions if the sensed values exceed a predetermined magnitude of departure from a norm thereof. Likewise, both the volume of carrier reagent solution and mixed salt concentrations therein can be continuously monitored by conventional volumetric control regulators and by pH control monitors for the carrier reagent solutions at the points of entry and exit from the loci of absorption and desorption and at any other desired location with the system.

Referring now to the drawing by way of presently preferred examples, a water vapor saturated sulfur dioxide-bearing gas stream such as an industrial waste gas emanating from a smelter or the like at an exemplary temperature of about 120°–140°F. is introduced, as at 1, into a wet type electrostatic precipitator, generally designated 2. Such precipitator 2 conventionally includes a plurality of high voltage corona emitting ionizing electrodes, such as a plurality of spaced wires $2a$, disposed in spaced relation with a plurality of grounded collector plates $2b$. In order to provide for large amounts of exposed surface areas in the path of gas flow, such plates are desirably disposed in a multilayer and offset or staggered relation, which additionally directs the gas flow therepast in an essentially serpentine configuration. The electrodes and collector plates are disposed within a suitable housing $2c$ shaped to permit the directed delivery of absorptive fluid which is adapted to flow downwardly over the surface of the collector plates $2b$ and to be channeled into and through a delivery conduit $2d$.

In operation of the subject unit, the sulfur dioxide bearing gas stream, together with various particulates entrained therewith, is initially directed past the high voltage electrodes $2a$, wherein the gas stream and its contents are subjected to the ionizing effect of the corona currents emitted therefrom. As is conventional in electrostatic precipitators, the electrostatic force field disposed between the electrodes $2a$ and the collector plates $2b$ will operate to effect a selectively directed depostion of all charged elements moving there within on the grounded collector plates. Thus, the gas stream and its contents, subsequent to exposure to the ionizing effect of the corona currents emitted from the electrodes $2a$ will be subject to the enhanced directional deposition forces attendant the electrostatic force field.

A substantially saturated aqueous solution of about 4 parts of monoammonium phosphate to 1 part of diammonium phosphate and having a pH in the range of about 4.5 to 6.0 and preferably at a temperature at least 10°F. above that of the gas being treated, is introduced with the precipitator 2 and directed to flow downwardly, in relatively thin film form, over the collector plates $2b$ for disposition in receptive absorbent contact with the charged portions of the sulfur dioxide-bearing waste gas stream. As will now be apparent, the absorbent solution performs the additional function of washing down the collector plates $2b$ and in so doing, provides both a large surface area for the electrostatically enhanced and directed absorption of the ionized components of the waste gas stream but also permits a marked increase in exposure time, all to the end of increasing the efficiency of the absorption operation. Preferably, the sulfur dioxide stripped waste gas exits from the top 4 thereof. The effluent carrier reagent solution, now bearing the absorbed sulfur dioxide values as well as collected particulates and having a lower pH exits from the bottom of the precipitator 2 and after preliminary filtering to remove substantially all of the particulates therefrom is accumulated in a holding reservoir 5. The reservoir 5 is desirably heated so as to prevent a drop in temperature of the carrier reagent solution and detrimental crystallization of the solids content thereof. Such preliminary filtered effluent carrier reagent solution may also be intermittently or continuously cycled through an adjacent filter 6 to assure that all crystallites or other solid or particulate matter is removed therefrom.

A predetermined portion of the effluent carrier reagent solution is directly recycled by the pump 7 through the holding tank 9 back into the gas-liquid contact device 2 to increase the amounts of sulfur dioxide absorbed therein, since such selectively constituted carrier reagent solution normally will not, on one pass through the precipitator 2, absorb the maximum possible amount of sulfur dioxide. The amount of recycled carrier reagent solution is selected, for any given installation, so as to effect operation at a realistically maximum level of sulfur dioxide absorption and to provide an effluent solution removably transferable to the desorption stage that is substantially saturated with sulfur dioxide in terms of the reaction mechanisms of equations (1) and (2) above.

Such sulfur dioxide-bearing effluent carrier reagent solution is also cycled by the pump 7 through the conduit 10 into a heat exchanger 11, conveniently serviceable by the available waste heat in the industrial gas stream being treated, wherein the solution temperature is desirably raised to just under that of its boiling point, as for example to about 210°–220°F. under atmospheric pressure conditions. The resultant elevated temperature carrier reagent solution is then introduced, via line 12, into the upper portion of a gas-liquid contact device 13 in which desorption of the sulfur dioxide values is effected by the thermal stripping at the boiling point of the carrier reagent solution, i.e., 215°–220°F. by countercurrent flow contact thereof with superheated steam introduced as at 14. Preferred operation should be characterized by little or no steam condensation in the desorber unit 13 and such can be effectively attained by having the steam exit therefrom still in superheated condition.

As evidenced by equations (4) and (5) supra, the stripped sulfur dioxide values exit from the desorber unit 13 via line 15 together with the water-vapor and superheated steam carrier therefor and in a form readily adapted to further conversion of the sulfur values therein to a commercially marketable form. The regenerated or reconstituted carrier reagent solution, now at a pH of about 4.5 to 6, exiting from the desorber unit 13 via line 16 is desirably passed through the heat exchanger 11 to reduce its temperature prior to its reintroduction by the action of pump 17, into the line 8 for reentry into the holding tank 9 and into the absorber-precipitator unit 2 together with the predetermined quantum of effluent carrier reagent solution portion recycled directly via pump 7 thereto.

The holding tank 9, into which make up water or other reagents may be added by line 18, facilitates the monitoring and requisite modification of the requisite temperature, concentration and pH characteristics of the mixed aqueous solution of monoammonium phosphate and diammonium phosphate prior to its reentry into the absorber-precipitator unit 2.

In accordance with the broader aspects of the present invention, it will be realized that by suitable adjustment of the pH of the overall carrier reagent salt solution in the entire system, e.g. to between about 4–6 well within the acid range and preferably about 4.5–6, either by reason of selective individual concentration of the monoammonium phosphate and diammonium phosphate and selective concordant ratios of these two reagents to each other within the numerical ranges generally noted above, or by introducing pH influencing or regulating agents into the system such as monoethanolamine and the like, or by both expedients, not only is selective sulfur dioxide absorption in preference to other acidic gases present in the initial sulfur dioxide bearing gas stream effected in the absorption stage, but such also results in an apparent minimization of diammonium phosphate hydrolysis and attendant undesired liberation of free ammonia in both stages of the system.

While generally an aqueous medium is contemplated as the carrier reagent vehicle or solvent medium for the salt solution in question, such aqueous medium need not be solely water. It may contain an organic component, preferably an inert organic liquid, as well, although the predominant component of the aqueous medium should be water, i.e., at least to the extent of at least 50 or 60%, and preferably 75 or 80%, by weight of water. Although it is not completely understood at the present time, it is believed that such organic fluids not only serve to influence the pH of particular system involved but also render the same more compatible where the absorption-desorption system is based upon the use of organic ammonium phosphate rather than or in addition to inorganic ammonium phosphates.

As disclosed in the copending Witte & Mehta application Ser. No. 410,448, filed Oct. 29, 1973, compressed air having sulfur dioxide introduced therein to provide a test gas mixture of a composition generally akin to an industrial waste gas or flue gas and containing:

| Constituent | % by vol. | % by weight |
|---|---|---|
| $N_2$ | 65.06 | 67.0 |
| $O_2$ | 14.43 | 17.26 |
| $H_2O$ | 19.57 | 13.17 |
| $SO_2$ | 0.36 | 0.86 |
| Remainder | 1.57 | 1.71 | comprising miscellaneous gases such as $CO_2$ and others commonly found in compressed air was contacted (in a limited liquid volume bench test set up) in countercurrent flow at a gas temperature of about 150°F with an aqueous salt solution being recirculated through an absorption zone. The salt solution at the start of the run had an average inlet composition of 450 grams/liter $NH_4H_2PO_4$ and 100 gram/liter $(NH_4)_2HPO_4$, a weight ratio of $NH_4H_2PO_4 : (NH_4)_2HPO_4$ of 4.5:1, a corresponding molar ratio of $NH_3 : H_3PO_4$ of 1.162 : 1, and a specific gravity at 140°F of 1.25. The average temperature of the salt solution at the absorption zone inlet was about 178°F and about 162°F at its outlet. The outlet waste gas effluent from the absorber zone had a temperature of 140°F.

The overall efficiency of the system, i.e., $SO_2$ recovered/total $SO_2$ introduced into the system; for the limited size and limited liquid flow laboratory equipment was as follows:

| Ex No. | Overall Efficiency | L/G | Desorber medium |
|---|---|---|---|
| 1 | 70 | 28 | super heated steam |
| 2 | 63 | 20 | super heated steam |
| 3 | 62.7 | 28 | hot nitrogen |
| 4 | 63 | 25 | electric coil heating | where L/G is representative of the gallons of solution employed per 1000 cubic feet of saturated gas being treated. Increase in the L/G ratios, as would be obtained in a larger scale installation, will inherently result in marked increase in overall efficiency. Increases in overall efficiency through enhanced absorption and higher absorption efficiencies will also be effected by the exposure of the sulfur dioxide bearing waste gas stream to the absorbent solution in an electrostatic force field, as described above. Not only will the disposition of the absorbent solution in thin film form on the precipitator collector plates result in an extended surface contact area and increased contact time, but the electrostatically enhanced directed deposition of ionized constituents in the gas stream, i.e., $SO_2$ molecules and particulates, all cooperatively contribute to markedly improved absorption and to a further increase in overall efficiency of operation.

Having thus described our invention, we claim:

1. In the removal of sulfur dioxide values from a sulfur dioxide bearing industrial waste gas stream, the steps of passing a water vapor saturated sulfur dioxide bearing gas stream through a charging zone to apply electrical charge to at least some of the constituent components thereof, introducing said charged sulfur dioxide bearing gas stream into absorbent contact with a concentrated solution of monoammonium phosphate and diammonium phosphate in a deposition zone wherein the weight basis proportion of mono to diammonium phosphate in said solution is in the range of about 4 to 1 to about 10 to 1 to effect removal of sulfur dioxide values from said gas stream, and maintaining an electrostatic force field between said charging zone and said deposition zone to electrostatically induce the directed displacement of the charged constituent components of said gas stream into absorbent contact with said solution.

2. The process as set forth in claim 1 including the step of passing said solution through said deposition zone in the form of a thin film.

3. The process as set forth in claim 1 including the step of filtering said solution after passage thereof through said deposition zone to separate solids therefrom, and the further step of recycling at least a portion of the filtered solution for absorbent contact in said deposition zone.

4. In the removal of sulfur dioxide values from a sulfur dioxide bearing industrial waste gas stream, the steps of displacing a water vapor saturated sulfur dioxide bearing gas stream past corona emitting charged electrodes to selectively charge at least some of the constituent components thereof, passing a concentrated solution of monoammonium phosphate and diammonium phosphate in which the weight basis proportion of mono to diammonium phosphate is in the range of about 4 to 1 to about 10 to 1 in film form over electrode elements disposed downstream of said charged electrodes, introducing said charged water vapor saturated sulfur dioxide bearing gas stream into absorbent contact with said solution to effect removal of sulfur dioxide values from said gas stream, and maintaining an electrostatic force field between said charged electrodes and said solution coated electrodes to electrostatically induce the directed displacement of the charged constituent components of said gas stream into absorbent contact with said solution.

* * * * *